(12) United States Patent
Yabe et al.

(10) Patent No.: US 7,239,461 B2
(45) Date of Patent: Jul. 3, 2007

(54) OBJECTIVE LENS DRIVE DEVICE

(75) Inventors: Mitoru Yabe, Kyoto (JP); Keiji Nakamura, Kyoto (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 86 days.

(21) Appl. No.: 10/529,469

(22) PCT Filed: Sep. 16, 2003

(86) PCT No.: PCT/JP03/11778

§ 371 (c)(1),
(2), (4) Date: Mar. 28, 2005

(87) PCT Pub. No.: WO2004/047091

PCT Pub. Date: Jun. 3, 2004

(65) Prior Publication Data

US 2005/0243442 A1 Nov. 3, 2005

(30) Foreign Application Priority Data

Nov. 21, 2002 (JP) .............................. 2002-337733

(51) Int. Cl.
*G02B 7/02* (2006.01)
*G11B 7/00* (2006.01)

(52) U.S. Cl. ...................... 359/813; 359/814; 359/823; 369/44.15; 369/44.16

(58) Field of Classification Search ................ 359/813, 359/811, 819, 822, 823, 821, 814, 824; 369/44.15, 369/44.16, 44.17
See application file for complete search history.

(56) References Cited

U.S. PATENT DOCUMENTS

| 5,523,891 A | * | 6/1996 | Fujisawa | .................... 359/813 |
| 5,905,255 A |   | 5/1999 | Wakabayashi et al. | |
| 6,331,741 B1 | * | 12/2001 | Suzuki | .................... 310/49 R |

FOREIGN PATENT DOCUMENTS

| JP | 63-275046 A | 11/1988 |
| JP | 2-55415 U | 4/1990 |
| JP | 5-101404 A | 4/1993 |
| JP | 7-19388 A | 3/1995 |
| JP | 8-7306 A | 1/1996 |
| JP | 8-249689 A | 9/1996 |
| JP | 2560379 B2 | 9/1996 |
| JP | 2003-132565 A | 5/2003 |
| JP | 2003-203372 A | 7/2003 |

* cited by examiner

*Primary Examiner*—Scott J. Sugarman
*Assistant Examiner*—Brandi Thomas
(74) *Attorney, Agent, or Firm*—Birch, Stewart, Kolasch & Birch, LLP

(57) ABSTRACT

A lens holder is so supported that the lens holder is movable along a supporting shaft in parallel to an optical axis of the object lens, and rotatable about the supporting shaft. Magnets are mounted on the lens holder. Focusing coils and tracking coils having sides facing the magnets are mounted on a base on which the supporting shaft is planted. Yokes are so provided that the yokes and the magnets respectively sandwich the focusing coils and the tracking coils. The yokes have facing portions that face respective magnetic poles of the magnets and extending portions extending in the directions away from the magnets.

35 Claims, 10 Drawing Sheets

OBJECTIVE LENS DRIVE DEVICE

TECHNICAL FIELD

This invention relates to an object lens driving device for the correction control of a focusing error and a tracking error of a light spot formed on an optical information recording medium such as an optical disk.

BACKGROUND ART

In order to record or reproduce information on an optical information recording medium, it is necessary to control the position of an object lens so that the focal point of the object lens is on an information recording surface and does not deviate from a track. For such a position controlling, there is provided an object lens driving device of a so-called moving-magnet type in which a magnet is mounted on a movable body that supports the object lens. An example is disclosed in Japanese Provisional Patent Publication No. 7-19388 (pages 2–3, FIGS. 1 and 2).

In a conventional object lens driving device of the moving-magnet type, the movable body is supported by a support shaft planted on a base so that the movable body is movable along the support shaft and rotatable about the support shaft. A focusing coil and a tracking coil are attached to the base so that the focusing coil and the tracking coil face the magnet. Further, a spring member for determining a neutral position of the movable body is provided on the base. In order to perform the correction control of the focusing error, the movable body moves along the support shaft by means of an electromagnetic force generated by current flowing in the focusing coil. In order to perform the correction control of the tracking error, the movable body rotates about the support shaft by means of an electromagnetic force generated by current flowing in the tracking coil. When the currents supplied to the focusing coil and the tracking coil are stopped, the movable body returns to the neutral position by the action of the spring member.

However, in such a conventional object lens driving device, it is necessary to provide the spring member for determining the neutral position of the movable body, and therefore the number of parts increases. As a result, the cost increases and the assembling becomes complicated.

Moreover, since the magnetic circuit is constituted by a magnet only, the magnetic flux density acting on the respective coils is small, and it is difficult to generate a large electromagnetic force. As a result, in order to obtain a sufficient responsibility (acceleration) of the movable body, there is a problem that a electric power consumption becomes large.

DISCLOSURE OF INVENTION

The present invention is made to solve the above described problems, and an object of the present invention is to provide an object lens driving device with less number of parts, being low in price, being easy to assemble, and in which the electric power consumption is small.

A object lens driving device according to the present invention comprises an object lens for collecting light on an information recording medium, a lens holder that holds the object lens, a base having a support shaft that supports the lens holder so that the lens holder is movable in a direction in parallel to an optical axis of the object lens, and rotatable about an axis parallel to the optical axis, a magnet mounted on the lens holder and magnetized in a direction substantially perpendicular to the optical axis, the magnet having a magnetic pole, a focusing coil mounted on the base, the focusing coil having a side facing the magnetic pole of the magnet and substantially perpendicular to the support shaft, a tracking coil mounted on the base, the tracking coil having a side facing the magnetic pole of the magnet and substantially parallel to the support shaft, and a yoke including a facing portion having a facing surface that faces the magnetic pole of the magnet, and an extending portion that extends from the facing portion in a direction away from the magnetic pole, the side of the focusing coil and the side of the tracking coil being disposed between the facing surface and the magnetic pole of the magnet.

As constructed above, it becomes possible to return the lens holder to a reference position without providing a spring member or the like, and therefore it becomes possible to reduce the number of parts, to reduce the price, to simplify the assembling, and to reduce the electric power consumption.

BEST MODE FOR CARRYING OUT THE INVENTION

Hereinafter, the best mode for carrying out the present invention will be described in concrete.

Embodiment 1.

Figure 1:
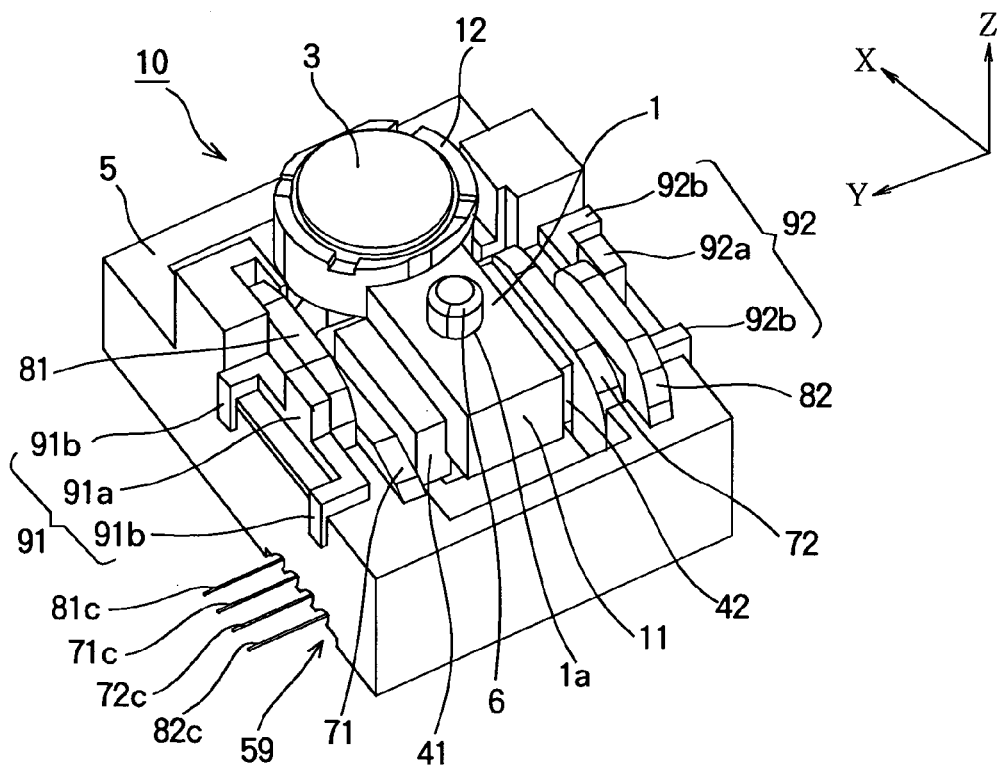
FIG. 1 is a perspective view of an object lens driving device according to Embodiment 1 of the present invention as seen from above.
Figure 2:
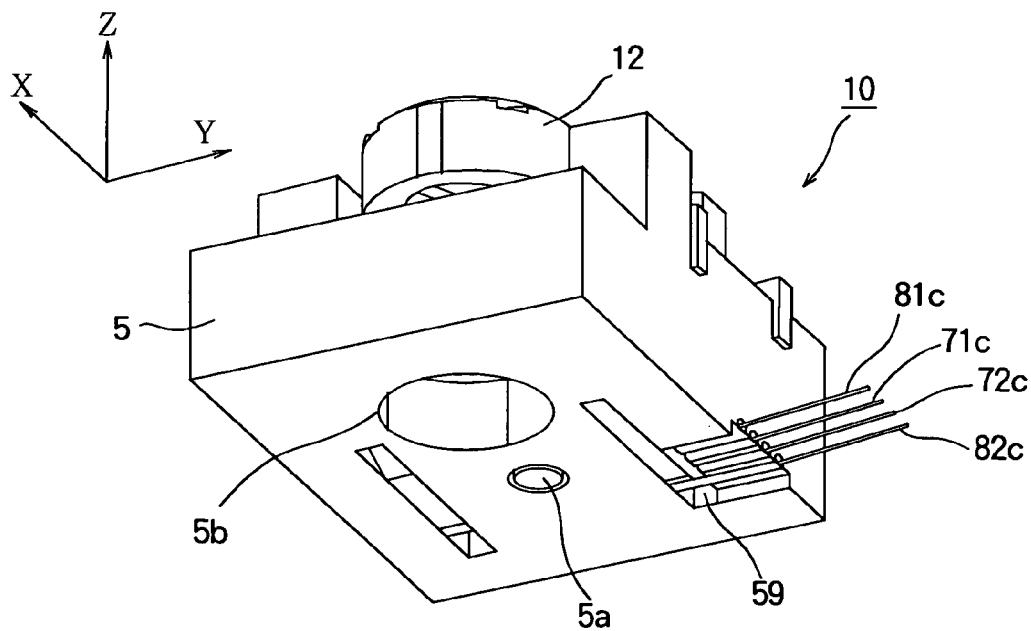
FIG. 2 is a perspective view of the object lens driving device according to Embodiment 1 of the present invention as seen from below.
Figure 3:
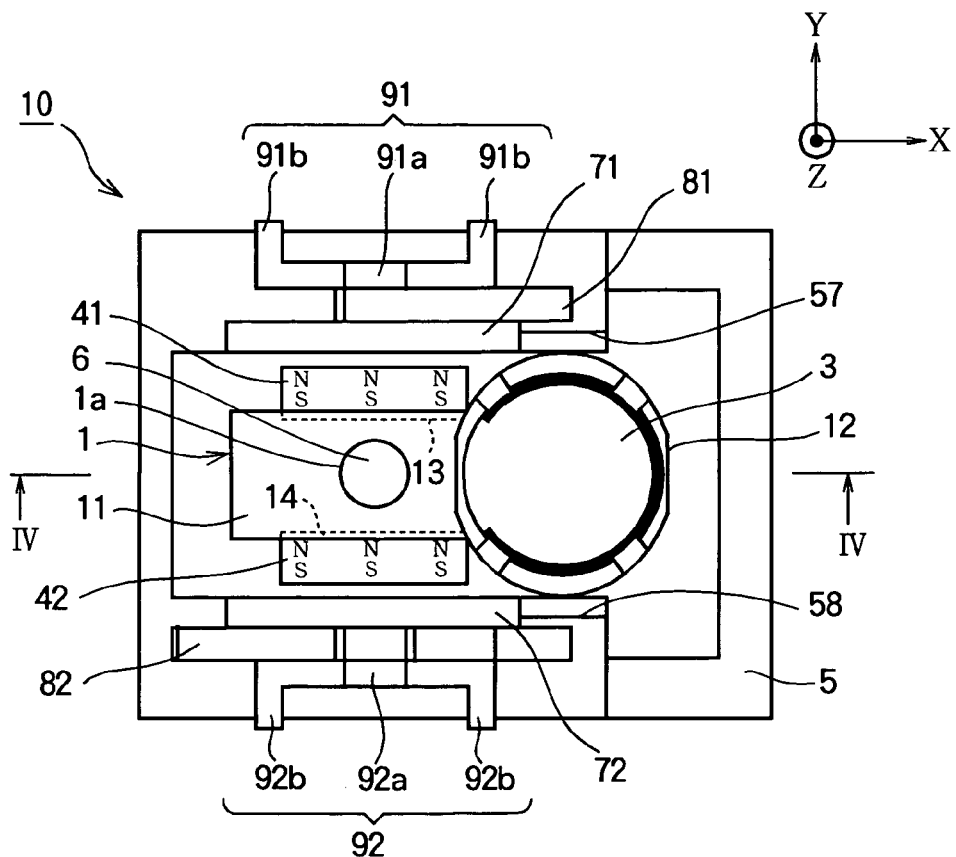
FIG. 3 is a top view of the object lens driving device according to Embodiment 1 of the present invention.
Figure 4:
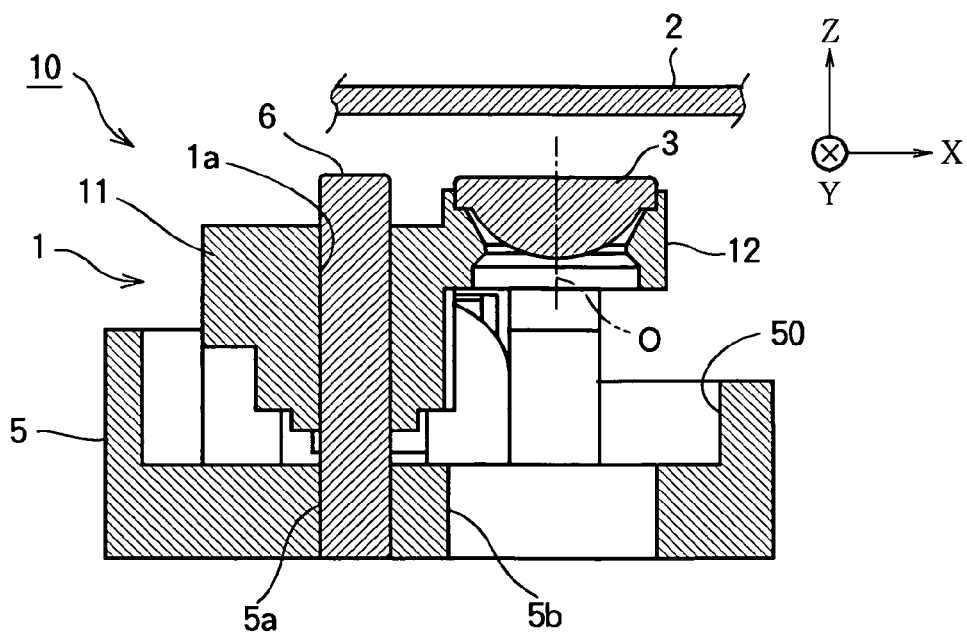
FIG. 4 is a sectional view of the object lens driving device according to Embodiment 1 of the present invention, taken on line IV—IV in FIG. 3.
Figure 5:
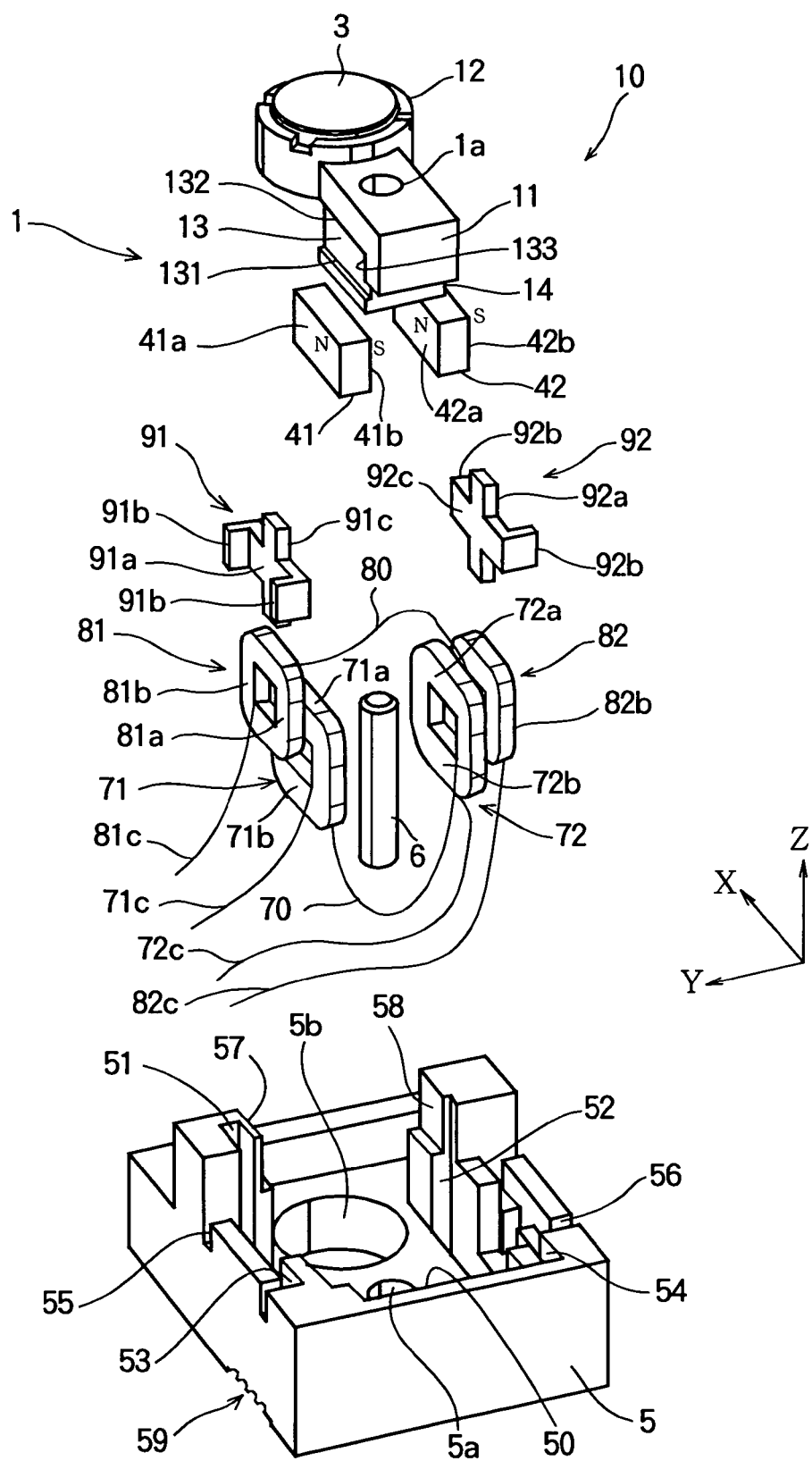
FIG. 5 is an exploded perspective view of the object lens driving device according to Embodiment 1 of the present invention.
Figure 6:
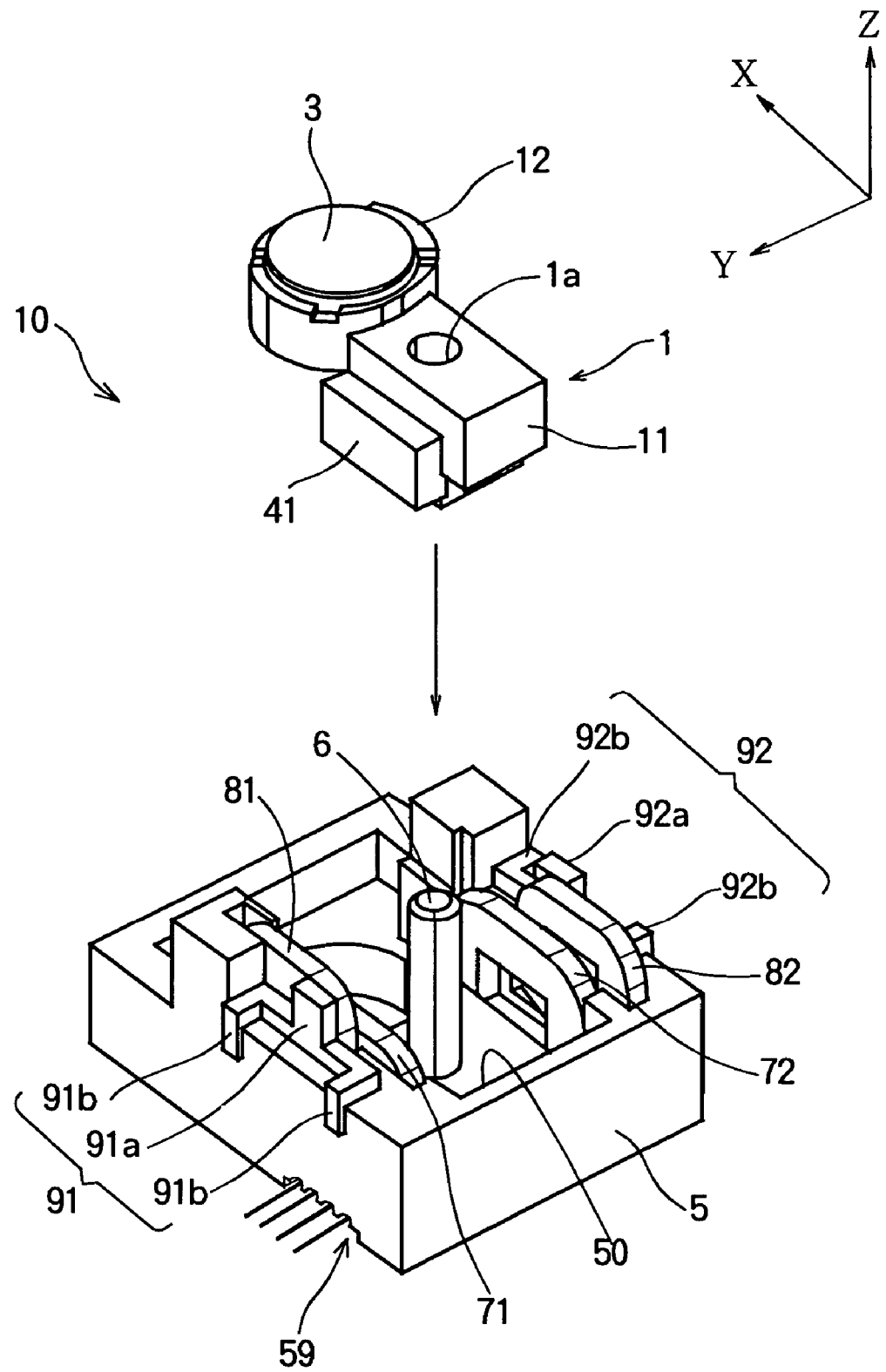
FIG. 6 is a perspective view separately showing a movable part and a stationary part of the object lens driving device according to Embodiment 1 of the present invention.

FIGS. 1 and 2 are perspective views of an object lens driving device 10 according to Embodiment 1 of the present invention as seen from above and below, respectively. FIG. 3 is a top view of the object lens driving device 10. FIG. 4 is a sectional view of the object lens driving device 10 taken on line IV—IV shown in FIG. 3. FIG. 5 is an exploded perspective view of the object lens driving device 10. FIG. 6 is an exploded perspective view separately showing a movable part and a stationary part of the lens driving device 10.

As shown in FIG. 1, the object lens driving device 10 includes a lens holder 1 that holds an object lens 3 for collecting a light beam on an information recording medium 2 (FIG. 4). The lens holder 1 is made of a lightweight and highly rigid plastic material or the like. A shaft receiving hole 1a is formed on a center portion of the lens holder 1, in parallel to the optical axis of the object lens 3. A supporting shaft 6, extending in the direction toward and away from the information recording medium 2, is inserted into the shaft receiving hole 1a. With this, the lens holder 1 is supported by the support shaft 6 so that the lens holder 1 is movable along the support shaft 6 and rotatable about the support shaft 6.

Hereinafter, the direction parallel to the support shaft 6 (i.e., the direction toward and away from the information recording medium 2) is defined as the direction of Z-axis. In XY-plane perpendicular to the direction of Z-axis, the direction traversing the track of the information recording medium 2 is defined as the direction of Y-axis. The direction perpendicular to the directions of Y-axis and Z-axis is defined as the direction of X-axis. The structure of the lens holder 1 is explained on the assumption that the direction connecting the centers of the support shaft 6 and the object lens 3 is aligned with the direction of X-axis.

As shown in FIG. 3, the lens holder 1 includes a holder main body 11 (on which the above described shaft receiving hole 1a is formed) elongated in the direction of X-axis, and a lens holding portion 12 formed on an end of the holder main body 11 in the longitudinal direction thereof. Mounting surfaces 13 and 14 (inwardly recessed flat surfaces) are formed on both side surfaces of the holder main body 11 in the direction of Y-axis. Magnets 41 and 42, in the shape of rectangular parallelepiped, are fixed to the mounting surfaces 13 and 14. As shown in FIG. 5, around the mounting surface 13, frame portions 131 and 132 that substantially contact both ends of the magnet 41 in the direction of Z-axis and a frame portion 133 that substantially contacts one side (opposite to the lens mounting portion 12 side) of the magnet 41 in the direction of X-axis. Although omitted in the drawing, similar frame portions are formed around the mounting surface 14.

The magnet 41 is parallel-magnetized in the direction of Y-axis so that an S-pole 41b is formed on the lens holder 1 side and an N-pole 41a is formed on the opposite side to the lens holder 1 side. The surfaces on the sides of the N-pole 41a and the S-pole 41b of the magnet 41 are perpendicular to Y-axis. The magnet 42 is parallel-magnetized in the direction of Y-axis so that an N-pole 42a is formed on the lens holder 1 side and an S-pole 42b is formed on the opposite side to the lens holder 1 side. The surfaces on the sides of the N-pole 42a and the S-pole 42b of the magnet 42 are perpendicular to Y-axis.

As shown in FIG. 4, the base 5 on which the support shaft 6 is planted is made of non-magnetic material, for example, engineering plastic such as polyphenylene-sulfide (PPS) or aluminum. The base 5 has a hole 5b through which the light beam passes toward the object lens 3. A through hole 5a, in parallel to the optical axis of the object lens 3, is formed on the center portion of the base 5. The above described support shaft 6 is fixed to the through hole 5a by press-fitting or the like. A fluorine resin or the like having a small friction coefficient is coated on the surface of the support shaft 6.

As shown in FIG. 5, a recess 50 is formed on the base 5 for storing the lens holder 1. In the recess 50, side walls 57 and 58 are formed on the outer portions of the lens holding portion 12 of the lens holder 1 in the direction of Y-axis. The side walls 57 and 58 are able to abut against the side surfaces of the lens holding portion 12. The side walls 57 and 58 are provided for regulating the rotatable range of the lens holder 1.

As shown in FIG. 5, focusing coils 71 and 72 are flatly wound in rectangular forms. In the base 5, the focusing coils 71 and 72 are fixed to the focusing coil mounting portions 51 and 52 formed on the outer sides of the recess 50 in the direction of Y-axis. The focusing coil 71 has two sides 71a and 71b of the direction of X-axis and two sides of the direction of Z-axis, and the side 71a of the direction of X-axis faces the N-pole 41a of the magnet 41. Similarly, the focusing coil 72 has two sides 72a and 72b of the direction of X-axis and two sides of the direction of Z-axis, and the side 72a of the direction of X-axis faces the S-pole 42b of the magnet 42. The focusing coils 71 and 72 are connected to each other in series by means of a connecting portion 70. End line portions 71c and 72c of the focusing coils 71 and 72 are taken out through grooves 59 formed on the base 5.

The tracking coils 81 and 82 are flatly wound in rectangular forms and are provided on the outer sides of the focusing coils 71 and 72 in the direction of Y-axis. In the base 5, the tracking coils 81 and 82 are fixed to tracking coil mounting portions 53 and 54 formed on outer sides of the focusing coil mounting portions 51 and 52 in the direction of Y-axis. The tracking coil 81 has two sides of the direction of X-axis and two sides 81a and 81b of the direction of Z-axis. The side 81a of the direction of Z-axis faces the N-pole 41a of the magnet 41. Similarly, the tracking coil 82 has two sides of the direction of X-axis and two sides 82a and 82b of the direction of Z-axis. The side 82a (FIG. 7) of the direction of Z-axis faces the S-pole 42b of the magnet 42. The tracking coils 81 and 82 are connected to each other in series by means of a connecting portion 80. End lines portions 81c and 82c of the tracking coils 81 and 82 are taken out through grooves 69 formed on the base 5.

Yokes 91 and 92 are provided outside the tracking coils 81 and 82. The yokes 91 and 92 are formed by press molding of magnetic material such as cold-roll steel, and fixed to yoke mounting portions 55 and 56 formed on both ends of the stationary base 5 in the direction of Y-axis. The yokes 91 and 92 have facing portions 91a and 92a each having a shape in which two elongated portions respectively extending in the directions of X-axis of Z-axis are jointed in the shape of a cross. Inner surfaces of the facing portions 91a and 92a in the direction of Y-axis form facing surfaces 91c and 92c that face the magnets 41 and 42. A pair of extending portions 91b are formed on both ends of the facing portions 91a of the yoke 91 in the direction of X-axis, and extend in the direction away from the magnet 41. A pair of extending portions 92b are formed on both ends of the facing portions 92a of the yoke 92 in the direction of X-axis, and extend in the direction away from the magnet 42. The distance from the center axis of the through hole 5a to the yoke mounting portion 55 is slightly shorter than the distance from the center axis of the through hole 5a to the yoke mounting portion 56. With this, the center axis of the support shaft 6 is closer to the yoke 92 than to the yoke 91.

Figure 7:
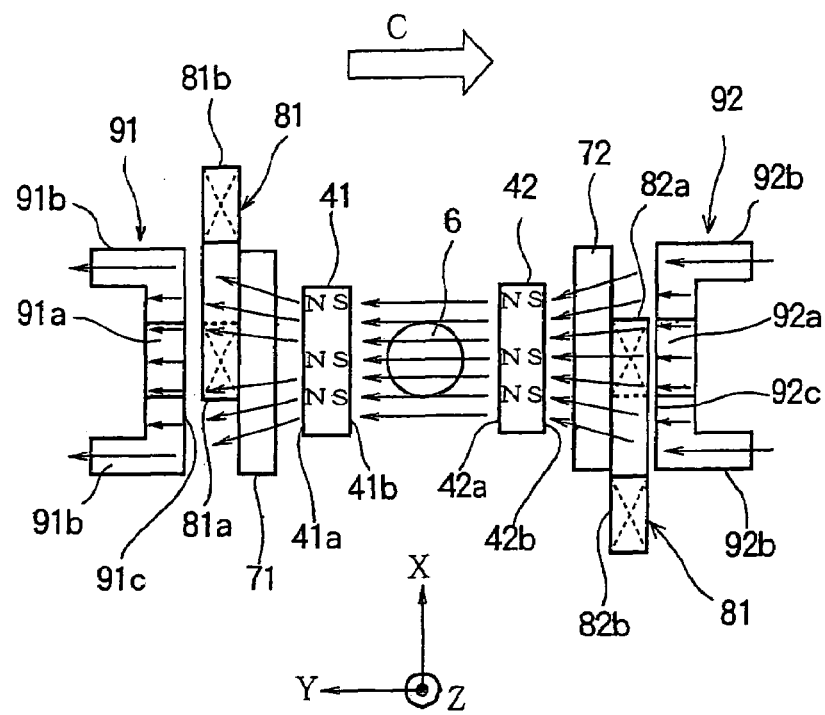
FIG. 7 is a view showing a positional relationship between yokes, magnets and respective coils of the object lens driving device according to Embodiment 1 of the present invention.
Figure 8:
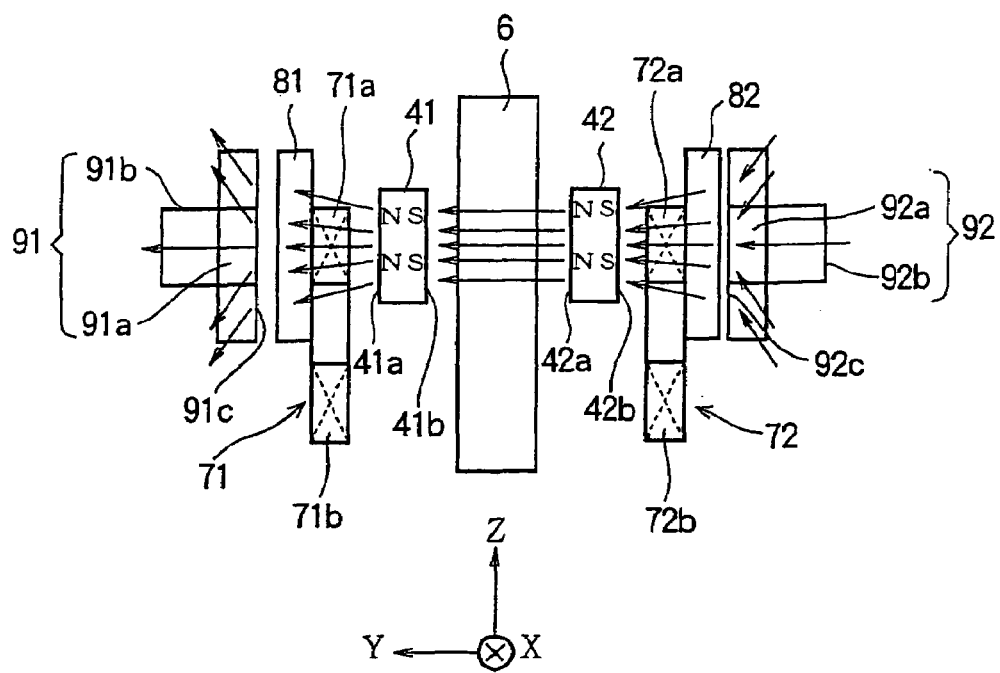
FIG. 8 is a view showing a positional relationship between the yokes, the magnets and the respective coils of the object lens driving device according to Embodiment 1 of the present invention.

FIGS. 7 and 8 are views showing the positional relationship between the yokes 91 and 92, the magnets 41 and 42, the focusing coils 71 and 72 and the tracking coils 81 and 82. FIGS. 7 and 8 shows the positional relationship respectively shown in the directions of Z-axis and X-axis, and the magnetic-flux is indicated by a plurality of arrows.

As shown in FIGS. 7 and 8, the magnets 41 and 42 and the yokes 91 and 92 are so disposed that centers thereof are aligned in the direction of Y-axis. The side 71a (FIG. 8) of the focusing coil 71 and the side 81a of the tracking coil 81 are disposed between the N-pole 41a of the magnet 41 and the facing surface 91c of the yoke 91. Magnetic flux from the N-pole 41a of the magnet 41 passes through the side 71a of the focusing coil 71 and the side 81a of the tracking coil 81, and reach the facing surface 91c of the yoke 91. A part of the magnetic flux that has reached the facing surface 91c of the yoke 91 passes through the extending portion 91b in the longitudinal direction thereof. Further, the side 72a (FIG. 8) of the focusing coil 72 and the side 82a of the tracking coil 82 are disposed between the S-pole 42b of the magnet 42 and the facing surface 92c of the yoke 92. The magnetic flux toward the S-pole 42b of the magnet 42 passes through the extending portion 92b of the yoke 92 in the longitudinal direction thereof, passes through the facing surface 92c, further passes through the side 82a of the tracking coil 82 and the side 72a of the focusing coil 72, and reaches the S-pole 42b of the magnet 42.

Next, the operation of the above constructed object lens driving device 10 will be described. When the correction control of the focusing error is to be performed, current flows through the focusing coils 71 and 72 connected in series. An electromagnetic force of the direction of Z-axis is generated by an interaction between the current flowing through the sides 71a and 72a (FIG. 8) of the focusing coils 71 and 72 and the magnetic field generated by the magnets 41 and 42. With this electromagnetic force in the direction of Z-axis, the lens holder 1 on which the magnets 41 and 42 are mounted moves along the support shaft 6. With this, the object lens 3 moves toward and away from the information recording medium 2, so that the correction control of the focusing error is performed.

According to the movement of the lens holder 1, the magnetic field between the magnets 41 and 42 and the yokes 91 and 92 changes, so that a magnetic recovering force is generated according to the moving amount of the lens holder 1. Because the magnetic flux density is the highest at the center portions of the magnets 41 and 42 in the direction of Z-axis, the most stable condition is obtained when the centers of the yokes 91 and 92 and the centers of the magnets 41 and 42 are aligned with each other in the direction of Z-axis as shown in FIG. 8. Therefore, when the lens holder 1 moves in the direction of Z-axis and the centers of the yokes 91 and 92 and the centers of the magnets 41 and 42 shift from each other, the recovering force is generated for recovering the original stable condition. When the supply of the current to the focusing coils 71 and 72 is stopped, the lens holder 1 returns to a reference position in the direction of Z-axis (due to the recovering force), i.e., a position in which the centers of the yokes 91 and 92 and the centers of the magnets 41 and 42 are aligned with each other. The shapes and the dimensions of the yokes 91 and 92 are so determined that a linearity (proportionality between the moving amount and the recovering force) and a predetermined spring coefficient (a ratio of the recovering force to the moving amount) are obtained in a range (approximately ±1 mm) necessary for the correction control of the focusing error of the object lens 3.

When the correction control of the tracking error is to be performed, current flows through the tracking coils 81 and 82 connected to each other. An electromagnetic force of the direction of X-axis is generated by an interaction between the current flowing through the sides 81a and 82a (FIG. 7) of the tracking coils 81 and 82 and the magnetic field generated by the magnets 41 and 42. The electromagnetic force directed upward in FIG. 7 acts on the magnet 41, and the electromagnetic force directed downward in FIG. 7 acts on the magnet 42. As a result, the lens holder 1 to which the magnets 41 and 42 are mounted rotate clockwise in FIG. 7 about the support shaft 6. With this, the object lens 3 moves in the direction traversing the track of the information recording medium 2, so that the correction control of the tracking error is performed.

According to the rotation of the lens holder 1, the magnetic field between the magnets 41 and 42 and the yokes 91 and 92 changes, so that a magnetic recovering force is generated according to the rotating amount of the lens holder 1. In a state where the centers of the magnets 41 and 42 and the centers of the yokes 91 and 92 are aligned in the direction of Y-axis as shown in FIG. 7, the magnetic flux (substantially parallel to Y-axis) from the N-pole 41a of the magnet 41 passes through the extending portion 91b of the yoke 91 in the direction of Y-axis, and the magnetic flux (substantially parallel to Y-axis) toward the S-pole 42b of the magnet 42 passes through the extending portion 92b of the yoke 92 in the direction of Y-axis. As such, in a state where the direction of the magnetic flux caused by the magnets 41 and 42 and the longitudinal directions of the extending portions 91b and 92b are substantially aligned with each other, the most stable condition is obtained. When the lens holder 1 rotates, and the direction of the magnetic flux generated by the magnets 41 and 42 is inclined with respect to the longitudinal directions of the extending portions 91b and 92b, the recovering force is generated for recovering the original stable condition. Thus, when the supply of the current to the tracking coils 81 and 82 is stopped, the magnets 41 and 42 return to a reference position in the rotational direction, i.e., a position in which the direction of the magnetic flux of the magnets 41 and 42 and the longitudinal directions of the extending portions 91a and 92b are aligned with each other. The shapes and the dimensions of the yokes 91 and 92 are so determined that a linearity and a predetermined spring coefficient are obtained in a range (approximately ±0.5 mm) necessary for the correction control of the tracking error of the object lens 3.

The rotatable range of the lens holder 1 is regulated by the contact between the outer surface of the lens mounting portion 12 of the lens holder 1 and the side wall portions 57 and 58 formed on the base 5. By regulating the rotatable range of the lens holder 1, the contact of the magnets 41 and 42 with the focusing coils 71 and 72 and the tracking coils 81 and 82 are prevented.

As described above, according to Embodiment 1, it becomes possible to cause the lens holder 1 to return to the reference position in the direction of Z-axis and in the rotational direction, without using a spring member or the like. Therefore, it becomes possible to provide the object lens driving device 10 with small number of parts, being inexpensive, and being easy to assemble.

Further, since a magnetic circuit is formed by the magnets 41 and 42 and the yokes 91 and 92, the density of the magnetic flux effectively acting on the focusing coils 71 and 72 and the tracking coils 81 and 82 can be higher, compared with the case in which the magnetic circuit is formed by the magnets only. As a result, a large electromagnetic force can be generated by a small electric power consumption. In other words, the electric power consumption can be reduced, and the response can be enhanced.

Further, the distance between the magnet 42 and the yoke 92 is slightly less than the distance between the magnet 41 and the yoke 91, and therefore the magnetic attractive force between the magnet 42 and the yoke 92 is larger than the magnetic attractive force between the magnet 41 and the yoke 91, so that the force shown by an arrow C in FIG. 7 is applied to the lens holder 1. With this, the shaft receiving hole 1a of the lens holder 1 abuts against the support shaft 6, and therefore a shaking caused by the gap between the shaft receiving hole 1a and the support shaft 6 is prevented. As a result, the tilting or vibration of the object lens 3 is restricted.

Moreover, since the magnets 41 and 42, in the shape of rectangular parallelepiped, are disposed on positions symmetrical to each other with respect to the support shaft 6, it becomes possible to generate symmetric driving force with respect to the support shaft 6, and therefore the generation of the unnecessary resonance can be prevented. Since the magnets 41 and 42 in the shape of rectangular parallelepiped are used, it is not necessary to use complex-shaped magnets, and therefore the cost of the magnets can be reduced and the assembling facility is enhanced.

In the above described Embodiment 1, the yokes 91 and 92 are formed by press molding of the cold-roll steel or the like, and therefore the extending portions 91b and 92b are formed by bending both ends of the facing portions 91a and 92a in the direction of X-axis. However, it is possible to form the yokes 91 and 92 by sintering or the like, and to form the extending portions 91b and 92b one by one at the centers of the facing portions 91a and 92a.

Furthermore, although in the above described Embodiment 1, the magnets, the yokes, the focusing coils and the tracking coils are provided respectively by two, it is also possible to provide the magnet, the yoke, the focusing coil and the tracking coil respectively by one at a side of lens holder 1.

Embodiment 2.

Figure 9:
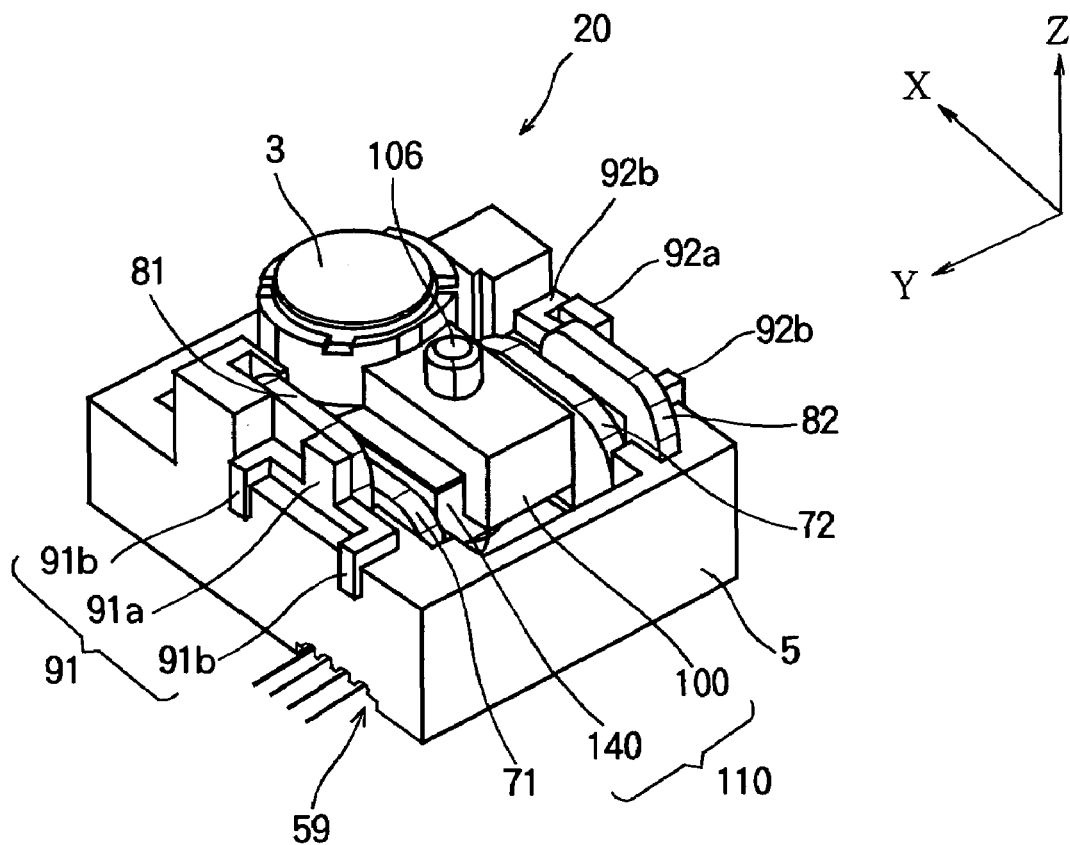
FIG. 9 is a perspective view of an object lens driving device according to Embodiment 2 of the present invention as seen from above.
Figure 10:
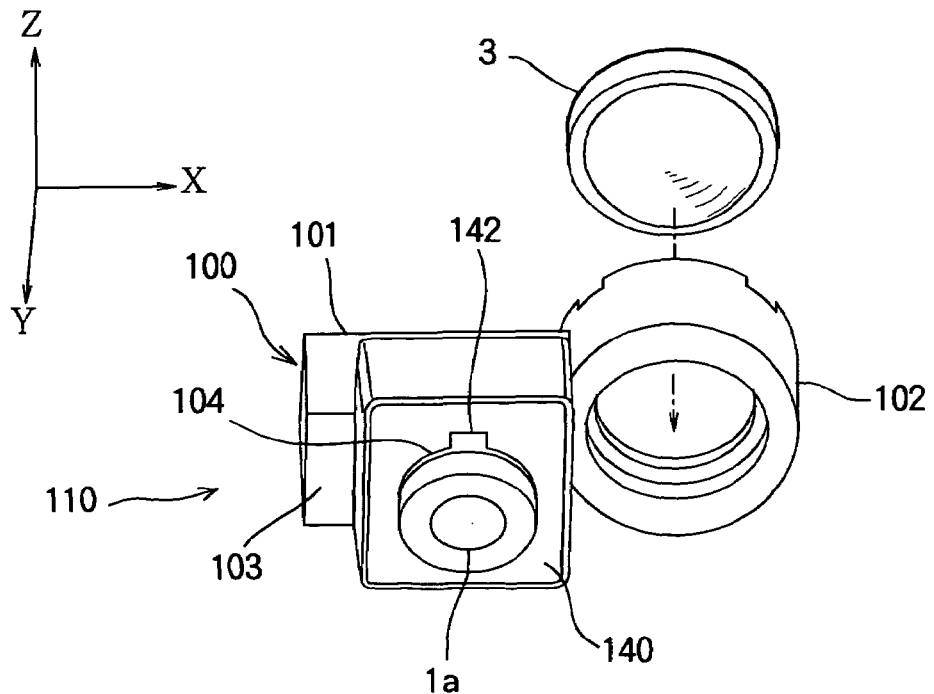
FIG. 10 is a perspective view of a lens holder and an object lens of the object lens driving device according to Embodiment 2 of the present invention.
Figure 11:
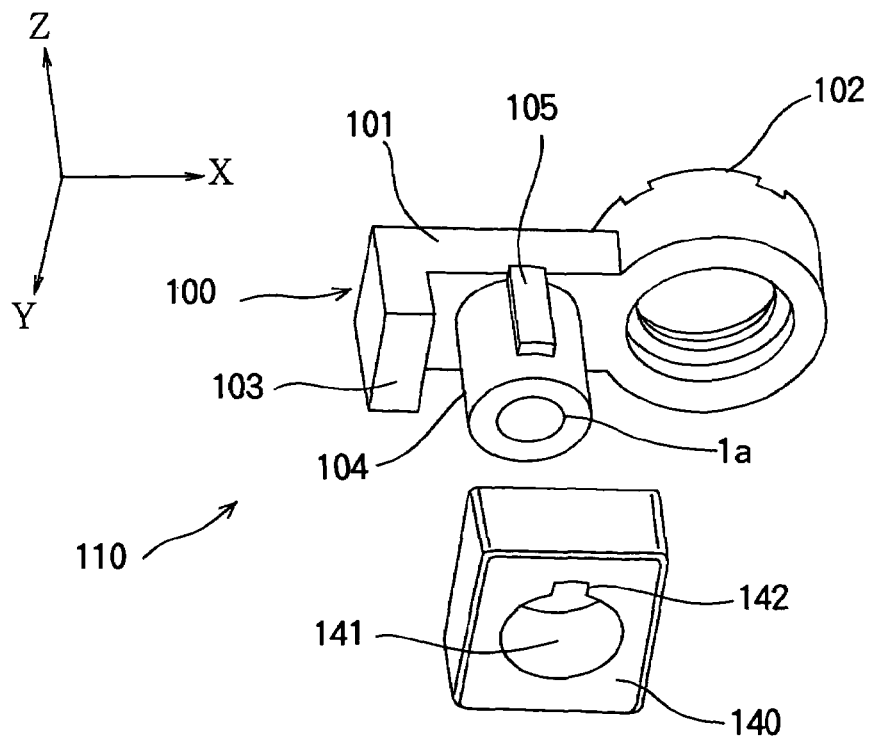
FIG. 11 is a perspective view separately showing a lens holder and a magnet of the object lens driving device according to Embodiment 2 of the present invention.
Figure 12:
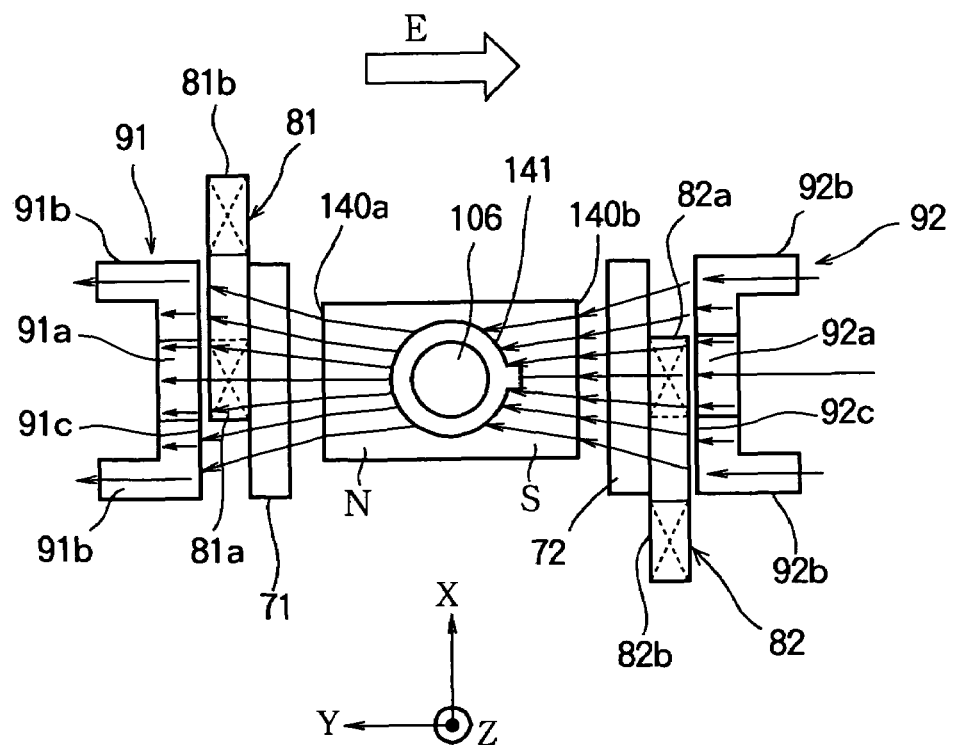
FIG. 12 is a view showing a positional relationship between yokes, magnets and respective coils of the object lens driving device according to Embodiment 2 of the present invention.
Figure 13:
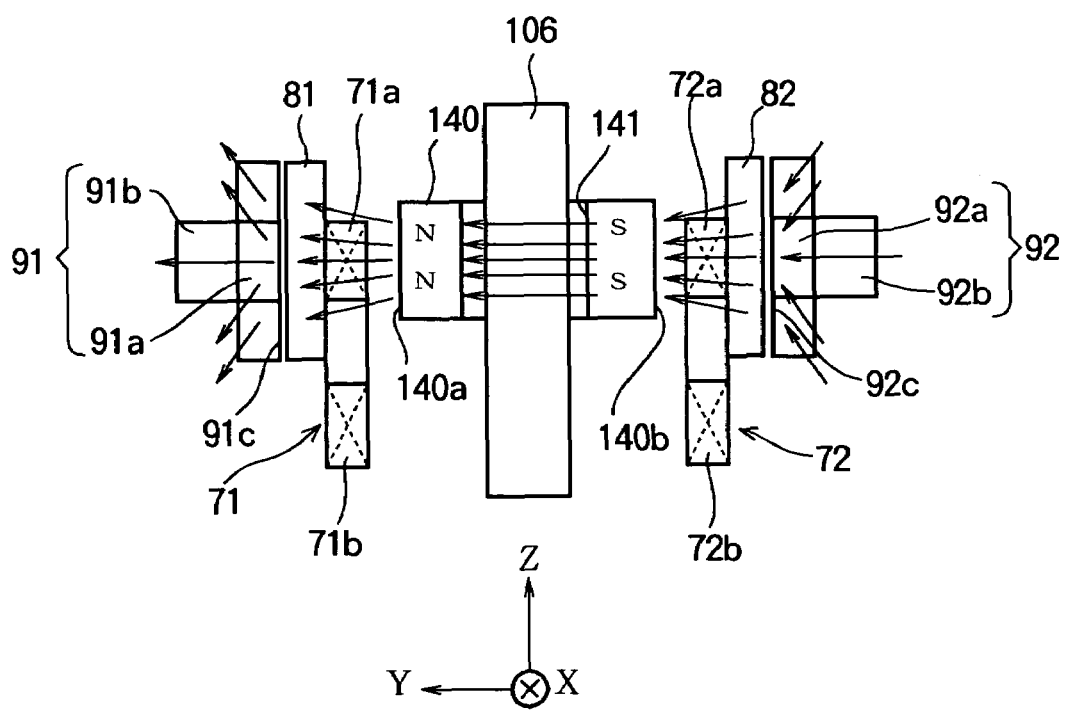
FIG. 13 is a view showing a positional relationship between the yokes, the magnets and the respective coils of the object lens driving device according to Embodiment 2 of the present invention.

FIG. 9 is a perspective view of an object lens driving device 20 according to Embodiment 2 of the present invention, as seen from above. FIG. 10 is a perspective view of a lens holder and an object lens of the object lens driving device 20. FIG. 11 is a perspective view separately showing the lens holder and the magnet integrally formed with each other in the object lens driving device 20. FIG. 12 and FIG. 13 are views showing the positional relationship of the yokes, the magnet and the respective coils. In FIGS. 9 through 13, components that are the same as or corresponding to those shown in FIGS. 1 through 8 are assigned the same reference numerals.

As shown in FIG. 10, in Embodiment 2, the lens holder 100 that holds the object lens 3 and the magnet 140 are integrally formed, and constitute a unit 110. The unit 110 is formed by integrally molding of a plastic material in which magnetic body is included, and then partially magnetizing a region corresponding to the magnet, so as to form a region that constitutes a magnet (referred to as a magnet 140) and a region that constitutes a lens holder (referred to as a lens holder 100).

As shown in FIG. 11, the lens holder 100 includes an elongated portion 101 elongated in the direction of X-axis, a lens mounting portion 102 formed on an end of the elongated portion 101, a bent portion 103 on the other end of the elongated portion 101 bent in the direction of Z-axis toward the base 5 (FIG. 9). At the center of the elongated portion 101, a cylindrical portion 104 is formed to protrude in the direction of Z-axis toward the base 5. In the cylindrical portion 104, a shaft receiving hole 1a coaxial with the cylindrical portion 104 is formed for inserting the support shaft 106 made of magnetic material. At the outer circumference of the cylindrical portion 104, a convex portion 105 elongated in the direction of Z-axis is formed on a portion that positions at an end of the elongated portion 101 in the width direction 101.

The magnet 140 is rectangular parallelepiped, and has a through hole 141 in the direction of Z-axis at the center thereof through which the cylindrical portion 104 is inserted. A groove 142 for inserting the convex portion 105 of the lens holder 100 is formed in adjacent to the through hole 141. The magnet 140 is parallel magnetized in the direction of Y-axis perpendicular to the shaft receiving hole 1a. One side of the magnet 140 in the direction of Y-axis is N-pole 140a, and the other side of the magnet 140 is S-pole 140b.

Different from Embodiment 1, the yokes 91 and 92 are attached to yoke mounting portions 55 and 56 of the base 5 so that the distances from the support shaft 106 to the yokes 91 and 92 are equal to each other. Other structure is the same as Embodiment 1.

FIGS. 12 and 13 respectively show positional relationship as seen in the directions of Z-axis and X-axis. As in FIGS. 7 and 8, the magnetic flux is indicated by plurality of arrows.

As shown in FIGS. 12 and 13, the side 71a (FIG. 13) of the focusing coil 71 and the side 81a of the tracking coil 81 are disposed between the N-pole 140a of the magnet 140 and the yoke 91. Magnetic flux from the N-pole 140a of the magnet 140 passes through the side 71a of the focusing coil 71 and the side 81a of the tracking coil 81, and reach the yoke 91. Further, the side 72a (FIG. 13) of the focusing coil 72 and the side 82a of the tracking coil 82 are disposed between the S-pole 140b of the magnet 140 and the yoke 92. The magnetic flux toward the S-pole 140b of the magnet 140 passes through the yoke 92, the side 72a of the focusing coil 72, and the side 82a of the tracking coil 82 and reaches the S-pole 140b of the magnet 140.

By allowing the current to flow through the focusing coils 71 and 72, the electromagnetic force in the direction of Z-axis is generated as was described in Embodiment 1, so that the lens holder 100 moves along the support shaft 106 and the correction control of the focusing error is performed. Further, according to the movement of the lens holder 100, a recovering force in the Z-direction is generated, as was described in Embodiment 1.

By allowing the current to flow through the tracking coils 81 and 82, the electromagnetic force in the direction of X-axis is generated as was described in Embodiment 1, so that the lens holder 100 rotates about the support shaft 106 and the correction control of the tracking error is performed. Further, according to the rotation of the lens holder 100, a recovering force in the rotational direction is generated as was described in Embodiment 1. However, in Embodiment 2, it is possible to efficiently generate the recovering force, compared with Embodiment 1. If no through hole 141 is formed on the magnet 140, the magnetic flux is distributed in the direction of X-axis so that the magnetic flux is large at the center in the direction of X-axis. Because the magnet 140 has the through hole 141 at the center in the direction of X-axis, the distribution of the magnetic flux becomes uniform in the direction of X-axis. Therefore, among the magnetic flux that passes through the magnet 140, a proportion of the magnetic flux that passes through the extending portions 91b and 92b increases. As a result, the recovering force can efficiently be generated.

Furthermore, since the support shaft 106 inserted into the through hole 141 of the magnet 140 is made of magnetic material, the magnetic attractive force between the magnet 140 and the support shaft 106 is generated. Because the through hole 141 has the groove 142, the shape of the through hole 141 is asymmetric with respect to the center axis of the support shaft 106 in the direction of Y-axis. Therefore, the support shaft 106 is attracted more strongly to the opposite side to the groove 142 of the magnet 140. The support shaft 106 is fixed to the base 5, and therefore the magnet 140 is urged in the direction indicated by an arrow E. As a result, a force is applied to the lens holder 1 in the direction in which the shaft receiving hole 1a abuts against the support shaft 106, so that the shaking caused by the gap between the shaft receiving hole 1a and the support shaft 106 is prevented. With this, the tilting or vibration of the object lens is restricted.

As described above, according to Embodiment 2, the magnet 140 and the lens holder 100 are integrally formed, and therefore the number of parts can be reduced and the assembling becomes easy. Additionally. if the magnet is attached to the outside of the lens holder, the weight and the inertial moment of the movable part increases and therefore the consumed electric current increases. However, in Embodiment 2, because the magnet 140 and the lens holder 100 are integrally formed, the weight of the movable part is reduced, and the inertial moment is reduced. As a result, a large electromagnetic force can be generated by a small electric power consumption. In other words, the electric power consumption can be restricted, and the response can be enhanced.

Further, since one magnet 140 is provided coaxially with the support shaft 106 of the lens holder 100, the driving force symmetric with respect to the support shaft can be generated, and therefore the unnecessary resonance can be prevented. Additionally, since the magnet 140 with high rigidity is provided on the center of the lens holder 100, the rigidity of the movable part is enhanced, and the unnecessary resonance can be prevented.

In addition, because the shaft receiving hole 1a of the lens holder 100 abuts against the support shaft 106 by means of the magnetic attractive force between the support shaft 106 made of magnetic material and the magnet 140, the shaking caused by the gap between the shaft receiving hole 1a and the support shaft 106 can be prevented, and therefore the tilting or vibration of the object lens 3 is restricted. Furthermore, with this structure, the generation of the driving force and the recovering force of the lens holder 1 are not influenced, and the magnitude and direction of the force urging the shaft receiving hole 1a against the support shaft 106 is constant irrespective of the position of the lens holder 1. Therefore, the shaking of the lens holder 100 is prevented in more stable condition.

Figure 14:
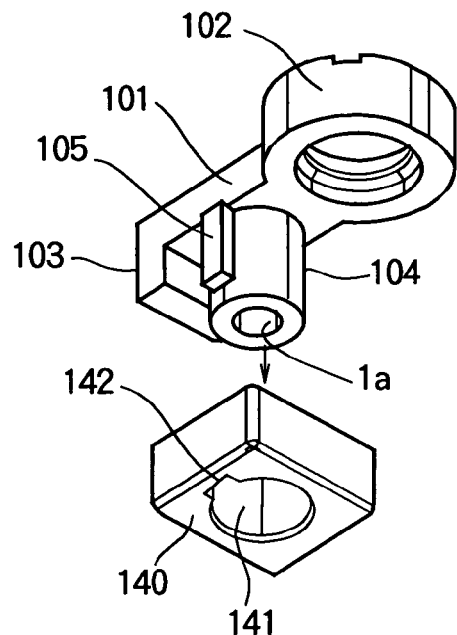
FIG. 14 is a view of another example of a lens holder of the object lens driving device according to Embodiment 2 of the present invention.

Although, in the above described Embodiment 2, the magnet 140 and the lens holder 100 are integrally formed, it is possible to separately form the magnet 140 and the lens holder 100 as shown in FIG. 14. In this case, the magnet 140 and the lens holder 100 can be fixed to each other by engaging the convex portion 105 of the lens holder 100 into the groove 142 of the magnet 140, inserting the cylindrical portion 104 of the lens holder 100 into the through hole 141 of the magnet 140, and adhere them.

Embodiment 3.

Figure 15:
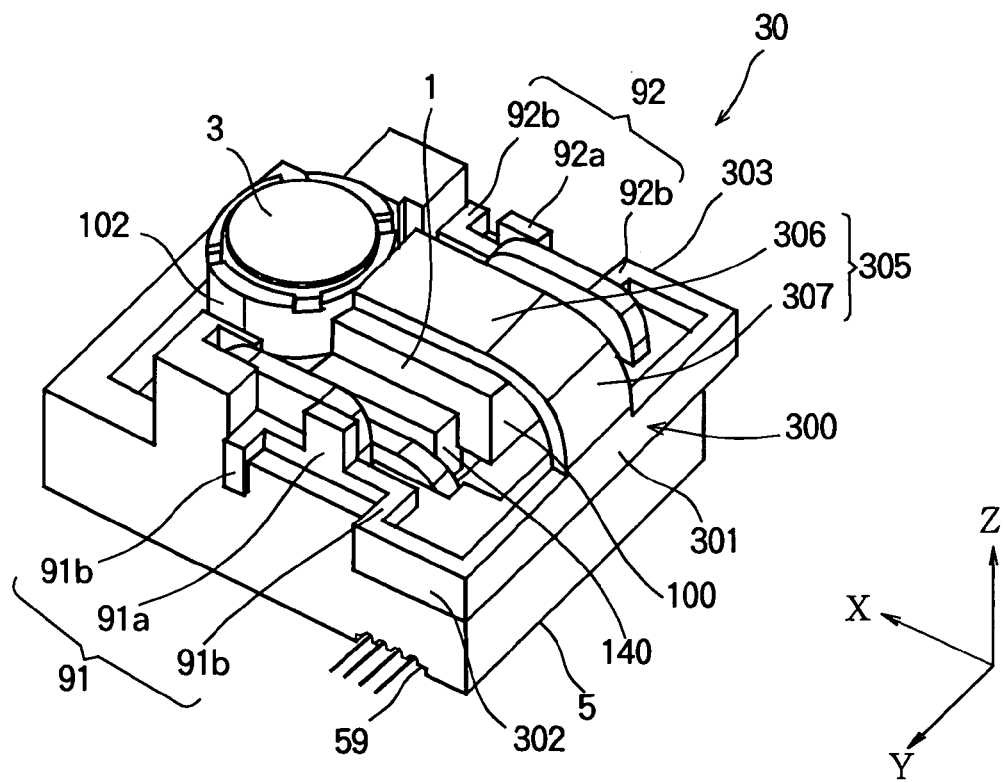
FIG. 15 is a perspective view of an object lens driving device according to Embodiment 3 of the present invention.
Figure 16:
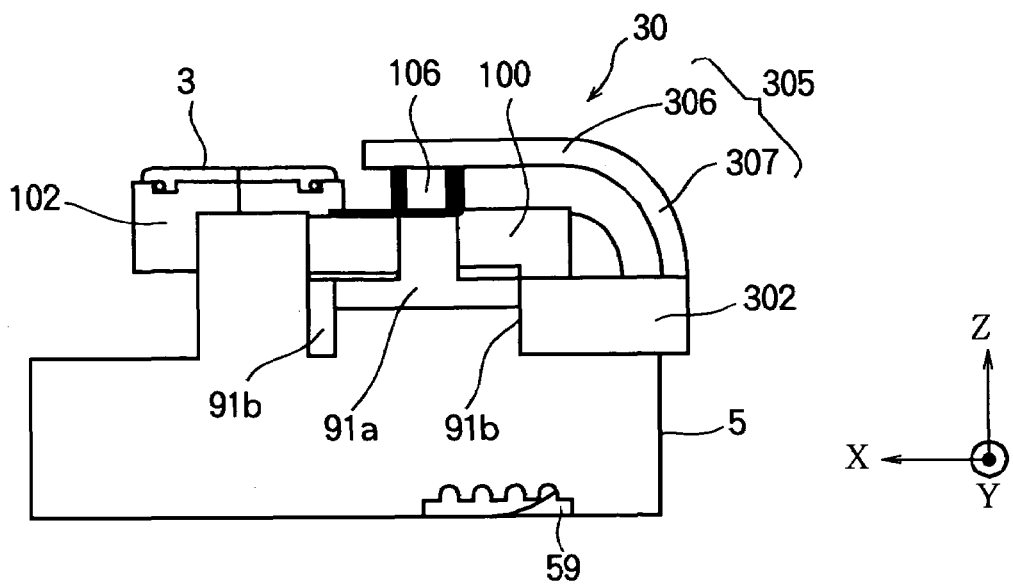
FIG. 16 is a side view of the object lens driving device according to Embodiment 3 of the present invention.
Figure 17:
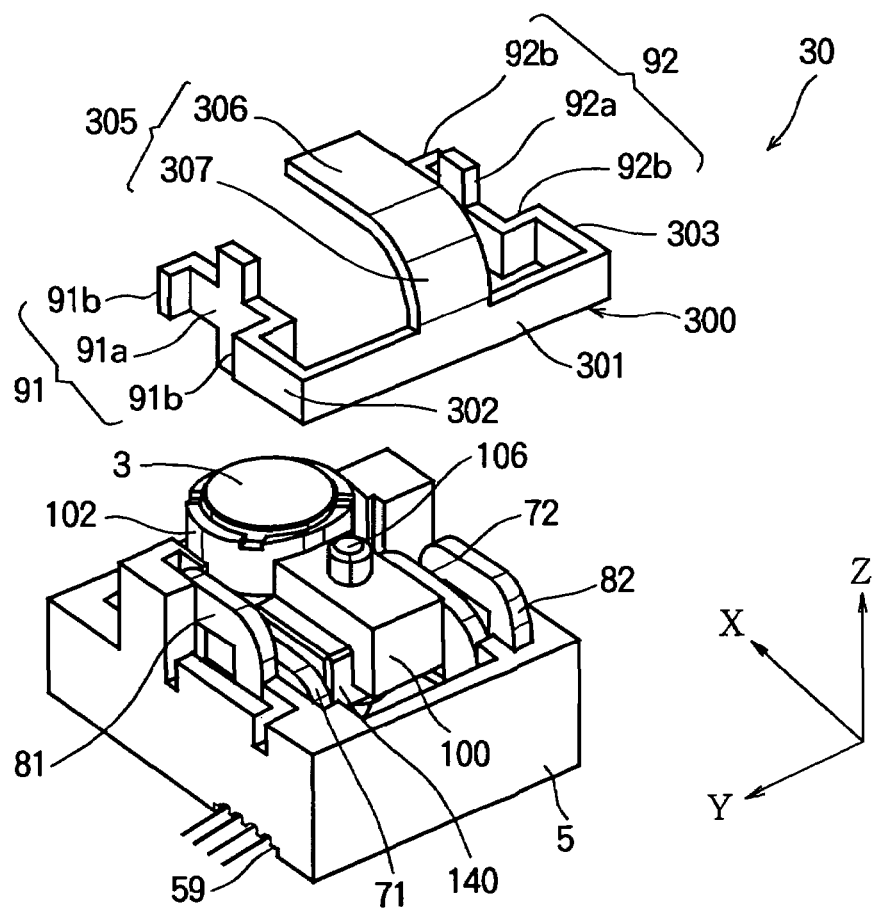
FIG. 17 is an exploded perspective view of the object lens driving device according to Embodiment 3 of the present invention.

FIG. 15 is a perspective view of an object lens driving device 30 according to Embodiment 3 of the present invention, as seen from above. FIG. 16 is a side view of the object lens driving device 30. FIG. 17 is an exploded perspective view of the object lens driving device 30. In FIGS. 15 through 17, components that are the same as or corresponding to those shown in FIGS. 1 through 14 are assigned the same reference numerals.

In Embodiment 3, the structures of the yokes are different from Embodiments 1 and 2. Components except the yokes are the same as Embodiment 1 and 2.

As shown in FIG. 15, the yoke of Embodiment 3 includes, in addition to the yokes 91 and 92 described in Embodiment 1, a connecting portion 300 made of magnetic material that connects the yokes 91 and 92. The connecting portion 300 includes an elongated portion 301 extending in the direction of Y-axis along the end of the base 5 at the rear side (i.e., the opposite side to the object lens 3). The elongated portion 301 is so disposed that the position in the direction of Z-axis is substantially the same as those of the yokes 91 and 92.

An end portion 302 of the elongated portion 301 extends to the front side (i.e., the object lens 3 side) along the side of the base 5, and is integrally connected to the extending portion 91b of the yoke 91. The other end portion 303 of the elongated portion 301 extends to the front side along the side of the base 5, and is integrally connected to the extending portion 92b of the yoke 92. The connecting portion 300 is so disposed that the connecting portion 300 is not overlapped with the magnet 140 seen in the direction of Z-axis. This is to prevent the connecting portion 300 from adhering to the magnet 140 when the magnet 140 moves in the direction toward the information recording medium 2.

A position regulating portion 305 extends in the direction of Z-axis away from the base 5 from the center in the longitudinal direction of the elongated portion 301 of the connecting portion 300. The position regulating portion 305 curves to the lens holder 100 side as the position shifts upward, and becomes substantially horizontal (i.e., substantially parallel to XY-plane) above the lens holder 100. This substantially horizontal portion (the horizontal portion 306) abuts against the upper end of the support shaft 106. Further, the above described curved portion 307 of the position regulating portion 305 gives an urging force that urges the horizontal portion 306 toward the base 5. The connecting portion 300 and the yoke 91 and 92 constitute a magnetic path, and therefore the density of the magnetic flux passing through the focusing coils 71 and 72 and the tracking coils 81 and 82 can be increased.

Because of the connecting portion 300, the yoke is disposed asymmetrically with respect to the support shaft 106 in the direction of the X-axis, and therefore the attractive force is applied to the magnet 140 in the direction of X-axis toward the connecting portion 300 side. Therefore, the force is applied to the lens holder 100, which urges the shaft receiving hole 1a against the support shaft 106, so that the shaking caused by the gap between the shaft receiving hole 1a and the support shaft 106 is prevented. With this, the tilting or vibration of the object lens can be restricted. In addition, it is not necessary to provide further member for preventing the shaking, and therefore the number of parts is reduced, and the assembling becomes easy.

As described above, according to Embodiment 3, by the provision of the yokes 91 and 92, the density of the magnetic flux passing through the focusing coils 71 and 72 and the tracking coils 81 and 82 can be increased, and therefore a large electromagnetic force can be generated by a small electric power consumption. In other words, the electric power consumption can be restricted, and the response can be enhanced.

Further, because the position regulating portion 305 abuts against the upper end of the support shaft 106, the position regulating portion 305 acts as a stopper that defines the limit of the movement of the lens holder 100 when the lens holder 100 moves in the direction (Z-axis) toward the information recording medium 2. Accordingly, the collision between the object lens 3 and the information recording medium 2 can be prevented, without providing a separate stopper.

Additionally, the invasion of the dust or the like into the gap between the support shaft 106 and the shaft receiving hole 1a can be prevented by the position regulating portion 305. Accordingly, it is not necessary to provide a cover member for preventing the invasion of the dust or the like into the gap between the support shaft 106 and the shaft receiving hole 1a, and therefore the number of parts can be reduced. In addition, the position regulating portion 305 urges the support shaft 106 to the base 5, and therefore the vibration of the support shaft 106 itself can be restricted, and excellent servo property is obtained.

In Embodiment 3, the position regulating portion 305 of the yoke reaches the upper end of the support shaft 106. However, as long as the position regulating portion 305 reaches to the upper surface of the lens holder 100, it is possible to limit the movement of the lens holder 100 even if the position regulating portion 305 does not reach the upper end of the support shaft 106.

The invention claimed is:

1. An object lens driving device, comprising:
   an object lens for collecting light on an information recording medium;
   a lens holder that holds said object lens;
   a base having a support shaft that supports said lens holder so that said lens holder is movable in a direction in parallel to an optical axis of said object lens, and rotatable about an axis parallel to said optical axis;
   a magnet mounted on said lens holder and magnetized in a direction substantially perpendicular to said optical axis, said magnet having a magnetic pole;
   a focusing coil mounted on said base, said focusing coil having a side facing said magnetic pole of said magnet and substantially perpendicular to said support shaft;
   a tracking coil mounted on said base, said tracking coil having a side facing said magnetic pole of said magnet and substantially parallel to said support shaft; and
   a yoke including a facing portion having a facing surface that faces said magnetic pole of said magnet, and an extending portion that extends from said facing portion in a direction away from said magnetic pole,
   wherein said side of said focusing coil and said side of said tracking coil are disposed between said facing surface of said yoke and said magnetic pole of said magnet.

2. The object lens driving device according to claim 1,
   wherein two said magnets are provided on two positions symmetrical to each other with respect to said support shaft so that different magnetic poles face each other, and
   wherein two said yokes are provided in opposition to magnetic poles of said two magnets opposite to said magnetic poles that face each other.

3. The object lens driving device according to claim 1,
   wherein said magnet has a hole through which said support shaft is inserted and two magnetic poles formed on positions symmetrical to each other with respect to said hole, and
   wherein two said yokes are provided in opposition to said magnetic poles of said magnet.

4. The object lens driving device according to claim 3,
   wherein said support shaft is made of a magnetic material, and
   wherein said hole of said magnet has a asymmetric shape with respect to a center axis of said support shaft in a direction of said magnetizing.

5. The object lens driving device according to claim 2, wherein said two yokes are so disposed that distances thereto from said supporting shaft are different from each other.

6. The object lens driving device according to claim 2, further comprising a connecting portion that connects said two yokes, and forms a magnetic path together with said two yokes.

7. The object lens driving device according to claim 6, wherein said connecting portion is disposed on a position which is not overlapped with said magnet in the direction of said optical axis of said object lens.

8. The object lens driving device according to claim 6, further comprising a position regulating member extending from said connecting portion to said information recording medium side of said lens holder, said position regulating member regulating the position of said lens holder in a direction toward said information recording medium.

9. The object lens driving device according to claim 8, wherein said position regulating member abuts against an end of said support shaft on said information recording medium side.

10. The object lens driving device according to claim 1, wherein said magnet is formed to include a plastic.

11. The object lens driving device according to claim 1, wherein said magnet is integrally formed with said lens holder.

12. The object lens driving device according to claim 1, wherein said lens holder is rotatable about said support shaft.

13. The object lens driving device according to claim 1, wherein said lens holder is brought to a neutral position without an elastic device.

14. An object lens driving device, comprising:
   an object lens configured to collect light on an information recording medium;
   a lens holder configured to hold the object lens, wherein a shaft receiving hole is formed in the lens holder in a direction substantially parallel to a Z direction;
   a support shaft mounted on a base and inserted into the shaft receiving hole of the lens holder and extending in the Z direction such that the lens holder is movable in the Z direction and rotatable substantially about the support shaft, wherein a line from a center of the object lens and a center of the support shaft substantially extends in a X direction;

a first magnet mounted on the on a first side of the lens holder from the support shaft substantially in a Y direction, wherein the first magnet is parallel-magnetized in substantially the Y direction such that a S-pole is formed on a first side of the first magnet and a N-pole is formed on second side of the first magnet opposite the first side;

a second magnet mounted on the on a second side of the lens holder from the support shaft substantially in the Y direction, wherein the second magnet is parallel-magnetized in substantially the Y direction such that a N-pole is formed on a first side of the second magnet and a S-pole is formed on second side of the second magnet opposite the first side;

a first focusing coil mounted on the base, wherein the first focusing coil includes a side facing the first magnet in the Y direction away from the support shaft and wherein the side facing the first magnet extends substantially in the X direction;

a second focusing coil mounted on the base, wherein the second focusing coil includes a side facing the second magnet in the Y direction away from the support shaft and wherein the side facing the second magnet extends substantially in the X direction;

a first tracking coil mounted on the base, wherein the first tracking coil includes a side facing the first focusing coil in the Y direction away from the support shaft and wherein the side facing the first focusing coil extends substantially in the Z direction;

a second tracking coil mounted on the base, wherein the second tracking coil includes a side facing the second focusing coil in the Y direction away from the support shaft and wherein the side facing the second focusing coil extends substantially in the Z direction;

a first yoke mounted on the base, wherein the first yoke includes a facing portion such that an inner surface of the facing portion of the first yoke faces the first tracking coil in the Y direction away from the support shaft and includes an extending portion that extends away from the first tracking coil; and a second yoke mounted on the base, wherein the second yoke includes a facing portion such that an inner surface of the facing portion of the second yoke faces the second tracking coil in the Y direction away from the support shaft and includes an extending portion that extends away from the second tracking coil, wherein the Z direction is a direction parallel to an optical axis of the object lens, wherein the wherein the X direction is normal to the Z direction, wherein the Y direction is a direction that is normal to the Z direction and normal to the X direction, wherein the object lens is moved in the Z direction when a focusing current is applied to the first focusing coil or to the second focusing coil or both, and wherein the object lens is rotated substantially about the support shaft when a tracking current is to the first tracking coil or to the second tracking coil or both.

15. The object lens driving device according to claim 14, wherein the first and second focusing coils are electrically connected in series with each other.

16. The object lens driving device according to claim 14, wherein the first and second tracking coils are electrically connected in series with each other.

17. The object lens driving device according to claim 14, wherein the extending portion of the first yoke extends away from the first tracking coil in the Y direction, or wherein the extending portion of the second yoke extends away from the second tracking coil in the Y direction, or both.

18. The object lens driving device according to claim 14, wherein a distance from the center of the support shaft to the first yoke is different from a distance from the center of the support shaft to the second yoke.

19. The object lens driving device according to claim 18, wherein the distance from the center of the support shaft to the first yoke is farther than the distance from the center of the support shaft to the second yoke.

20. The object lens driving device according to claim 14, wherein the first yoke includes a portion that is elongated in the X direction or a portion that is elongated in the Z direction or both, or wherein the second yoke includes a portion that is elongated in the X direction or a portion that is elongated in the Z direction or both, or both.

21. The object lens driving device according to claim 14, wherein the object lens is brought to a reference position without using an elastic device.

22. The object lens driving device according to claim 21, wherein when no focusing current is applied, the lens holder is brought to the reference position through a magnetic flux interaction between the first magnet and the first yoke or through a magnetic flux interaction between the second magnet and the second yoke or both.

23. An object lens driving device, comprising:

an object lens configured to collect light on an information recording medium;

a lens holder and configured to hold the object lens, the lens holder including:

a cylindrical portion protruding in a direction substantially parallel to a Z direction;

a shaft receiving hole formed in the cylindrical portion, the shaft receiving hold being coaxial with the cylindrical portion; and a magnet with a through hole such that the cylindrical portion is inserted into the through hole of the magnet, wherein the magnet is parallel-magnetized in substantially the Y direction such that a N-pole is formed on a first side of the magnet and a S-pole is formed on a second side of the magnet opposite the first side;

a support shaft mounted on a base and inserted into the shaft receiving hole of the cylindrical portion of the lens holder and extending in the Z direction such that the lens holder is movable in the Z direction and rotatable substantially about the support shaft, wherein a line from a center of the object lens and a center of the support shaft substantially extends in a X direction;

a first focusing coil mounted on the base, wherein the first focusing coil includes a side facing the first side of the magnet in the Y direction away from the support shaft and wherein the side facing the first side of the magnet extends substantially in the X direction;

a second focusing coil mounted on the base, wherein the first focusing coil includes a side facing the second side of the magnet in the Y direction away from the support shaft and wherein the side facing the second side of the magnet extends substantially in the X direction;

a first tracking coil mounted on the base, wherein the first tracking coil includes a side facing the first focusing coil in the Y direction away from the support shaft and wherein the side facing the first focusing coil extends substantially in the Z direction;

a second tracking coil mounted on the base, wherein the second tracking coil includes a side facing the second focusing coil in the Y direction away from the support shaft and wherein the side facing the second focusing coil extends substantially in the Z direction;

a first yoke mounted on the base, wherein the first yoke includes a facing portion such that an inner surface of the facing portion of the first yoke faces the first tracking coil in the Y direction away from the support shaft and includes an extending portion that extends away from the first tracking coil; and a second yoke mounted on the base, wherein the second yoke includes a facing portion such that an inner surface of the facing portion of the second yoke faces the second tracking coil in the Y direction away from the support shaft and includes an extending portion that extends away from the second tracking coil, wherein the Z direction is a direction parallel to an optical axis of the object lens, wherein the wherein the X direction is normal to the Z direction, wherein the Y direction is a direction that is normal to the Z direction and normal to the X direction, wherein the object lens is moved in the Z direction when a focusing current is applied to the first focusing coil or to the second focusing coil or both, and wherein the object lens is rotated substantially about the support shaft when a tracking current is to the first tracking coil or to the second tracking coil or both.

24. The object lens driving device according to claim 23, wherein the support shaft is magnetized.

25. The object lens driving device according to claim 23, wherein the lens holder further comprises:

a groove formed in the through hole of the magnet; and a convex portion formed on an outer portion the cylindrical portion such that the convex portion is inserted into the groove to limit an amount of rotation of the object lens.

26. The object lens driving device according to claim 23, wherein the groove is formed to extend in the Y direction toward the second side of the magnet.

27. The object lens driving device according to claim 23, wherein the first and second focusing coils are electrically connected in series with each other.

28. The object lens driving device according to claim 23, wherein the first and second tracking coils are electrically connected in series with each other.

29. The object lens driving device according to claim 23, wherein the extending portion of the first yoke extends away from the first tracking coil in the Y direction, or wherein the extending portion of the second yoke extends away from the second tracking coil in the Y direction, or both.

30. The object lens driving device according to claim 23, wherein the first yoke includes a portion that is elongated in the X direction or a portion that is elongated in the Z direction or both, or wherein the second yoke includes a portion that is elongated in the X direction or a portion that is elongated in the Z direction or both, or both.

31. The object lens driving device according to claim 23, wherein the object lens is brought to a reference position without using an elastic device.

32. The object lens driving device according to claim 31, wherein when no focusing current is applied, the lens holder is brought to the reference position through a magnetic flux interaction between the magnet and the first yoke or through a magnetic flux interaction between the magnet and the second yoke or both.

33. The object lens driving device according to claim 23, further comprising a connecting portion magnetically connecting the first yoke with the second yoke.

34. The object lens driving device according to claim 33, wherein the connecting portion magnetically connects the extending portion of the first yoke with the extending portion of the second yoke.

35. The object lens driving device according to claim 33, further comprising a position regulating portion formed above the support and configured to limit the movement of the lens holder in the Z direction.

* * * * *